United States Patent
Bratten

(10) Patent No.: US 7,077,954 B2
(45) Date of Patent: *Jul. 18, 2006

(54) APPARATUS AND METHOD FOR RECIRCULATING MACHINE TOOL COOLANT AND REMOVING FERROUS DEBRIS THEREFROM

(76) Inventor: Jack R. Bratten, 4657 Twin Fawn La., Orchard Lake, MI (US) 48324

( * ) Notice: Subject to any disclaimer, the term of this patent is extended or adjusted under 35 U.S.C. 154(b) by 475 days.

This patent is subject to a terminal disclaimer.

(21) Appl. No.: 10/394,513

(22) Filed: Mar. 21, 2003

(65) Prior Publication Data

US 2003/0218086 A1 Nov. 27, 2003

Related U.S. Application Data

(63) Continuation-in-part of application No. 09/498,178, filed on Feb. 4, 2000, now Pat. No. 6,705,555.

(60) Provisional application No. 60/366,807, filed on Mar. 22, 2002.

(51) Int. Cl.
 *B01D 17/12* (2006.01)
 *B01D 35/06* (2006.01)
 *B01D 36/00* (2006.01)
(52) U.S. Cl. .................. 210/223; 210/167; 210/168; 210/222; 210/257.1; 210/258; 210/298; 210/416.1
(58) Field of Classification Search ................ 210/167, 210/168, 194, 195.1, 222, 223, 257.1, 258, 210/295, 298, 416.1
See application file for complete search history.

(56) References Cited

U.S. PATENT DOCUMENTS

| | | | | |
|---|---|---|---|---|
| 5,331,769 A | * | 7/1994 | Walton | 451/249 |
| 5,980,735 A | * | 11/1999 | Bratten | 210/168 |
| 6,406,635 B1 | * | 6/2002 | Smith et al. | 210/805 |
| 6,705,555 B1 | * | 3/2004 | Bratten | 241/101.2 |

FOREIGN PATENT DOCUMENTS

| | | |
|---|---|---|
| DE | 1 034 306 | 9/1953 |
| EP | 0 536 973 A1 | 4/1993 |
| EP | 1 122 024 A2 | 8/2001 |

* cited by examiner

*Primary Examiner*—David A. Reifsnyder
(74) *Attorney, Agent, or Firm*—John R. Benefiel

(57) ABSTRACT

An apparatus and method for recirculating machine tool coolant in which coolant and entrained debris flowing in a shallow stream trough are raised to a higher level by rotation of a bladed wheel in a housing arranged to receive the liquid flow stream. Coolant and debris is then directed down at a magnetized body in a plunging discharge to bring ferrous debris into contact with an upwardly facing surface of the magnetized body. The coolant and nonferrous remaining entrained debris is collected in a tank and pumped back to the filter apparatus by a chopper pump which has a hardened impeller having cutting edges cutting up the remaining debris as it is pumped by the impeller.

6 Claims, 3 Drawing Sheets

APPARATUS AND METHOD FOR RECIRCULATING MACHINE TOOL COOLANT AND REMOVING FERROUS DEBRIS THEREFROM

CROSS REFERENCE TO RELATED APPLICATION

This application claims the benefit of U.S. provisional Ser. No. 60/366,807, filed Mar. 22, 2002 and is a continuation in part of U.S. Ser. No. 09/498,178, filed Feb. 4, 2000 now U.S. Pat. No. 6,705,555.

BACKGROUND OF THE INVENTION

This invention concerns the return of machine tool coolant to a filter apparatus. It is common practice in machine tool installations to collect the coolant draining from the cutting tools and the chips entrained therein in trenches or troughs extending below the machine tools, the drained coolant flowing down the trough to be collected in a sump from where it is pumped back to a filter apparatus.

As described in EP 1122024, industry trends have resulted in quite shallow depth above grade troughs being used to collect the coolant and chips.

The lift apparatus described and claimed in that patent was invented by the inventor named in this application to enable coolant in shallow streams to be lifted and collected in a tank so as to be able to be pumped to filter apparatus by a conventional pump.

Another problem has been encountered in such installations, in that relatively large steel or other ferrous metal objects occasionally fall into the trough, such as broken cutting tools, large bolts, or other machine parts, etc. These objects can cause damage to pumps, blockage in the piping, etc., particularly where aluminum chips are being generated and the equipment is designed to handle only aluminum turnings and chips.

The lift apparatus described in EP1122024 is very effective at removing large objects from the trough along with the chips and coolant, and depositing the same in a collecting tank.

It has heretofore been proposed by the present inventor to use a chip shredder conveyor between the lift station and a collector tank to reduce the size of the chips prior to pumping the coolant and chips from the collector tank back to the filtration apparatus. These conveyors have the ability to chop the chips that often form to be of a smaller size to prevent blockages and to achieve improved performance of the filter equipment. However, such conveyors do not operate reliably, particularly when large balls of chip turnings are present, which sometimes occurs.

U.S. Pat. No. 6,406,635 describes locating an inducer chopper in the inlet of a pump to chop the chips to a smaller size prior to pumping the same. This arrangement is limited in the size of objects which can be handled. The pump itself has a recessed impeller to avoid the wearing contact of chips with the impeller surfaces. This results in low pumping efficiency since it relies on induced vortices to create pumping action rather than direct pumping action by the impeller.

U.S. Pat. No. 3,973,866 describes a chopper pump in which cutting edges on the impeller blades are used to cut particles in the pumped liquid, and also includes a rotary tool ahead of the impeller to slice larger solid particles prior to entering the pump.

Large steel objects present a hazard to such conveyors and pumps and the associated piping.

It is the object of the present invention to provide a method and apparatus for efficiently and reliably recirculating coolant liquids in which chips and occasionally present items of ferrous metal debris to filtration apparatus from a shallow depth flow of machining coolant with equipment which can operate for long periods without replacement.

It is a further object to provide a method for reliably removing ferrous debris contained in shallow streams of machine tool coolant.

SUMMARY OF THE INVENTION

The above recited objects and other objects which will be understood upon a reading of the following specification and claims are achieved by causing the machine tool coolant with the entrained debris to be collected in an above grade tank to a great level than the depth of the coolant.

This is preferably done by the sweeping up the coolant and entrained debris in the shallow flowing stream to be slung over a weir edge by rotation of a wheel having tangential blades moving in the same general direction as the stream flow. An upwardly and reversely extending wall extends over the wheel to guide the movement of the coolant and entrained debris over the weir edge.

A discharge chute receives the coolant slung over the weir edge, redirecting the coolant to create a plunging flow of coolant against an upwardly facing magnetized body located below the level of the weir edge, the magnetized body upward facing surface impacted by the plunging coolant flow. The impingement of the coolant flow against the face of the magnetized body brings any ferrous debris items into contact with the surface and redirects the coolant into a collection tank having a sloping bottom extending to a lower well space. Any ferrous metal debris items impacting the magnetized body are captured by magnetic attraction therebetween to attract and hold the same.

The coolant and other nonferrous entrained debris is deflected by the magnetic body and cascades down into a collector tank having sloping walls leading to a bottom well space. A chopper pump having an impeller with cutting edges is mounted above the bottom well, and draws coolant and debris into a disintegrator tool which reduces the size of large debris such as turning balls, and subsequently cutting the nonferrous chip debris to smaller size by the cutter blades of the pump impeller. The chopper pump impeller is hardened to allow direct pumping contact with the coolant and chips to be able to efficiently pump the coolant and reduced size debris to a filter apparatus, where the coolant is filtered and returned to the machine tool installation for reuse.

DETAILED DESCRIPTION

Figure 1:
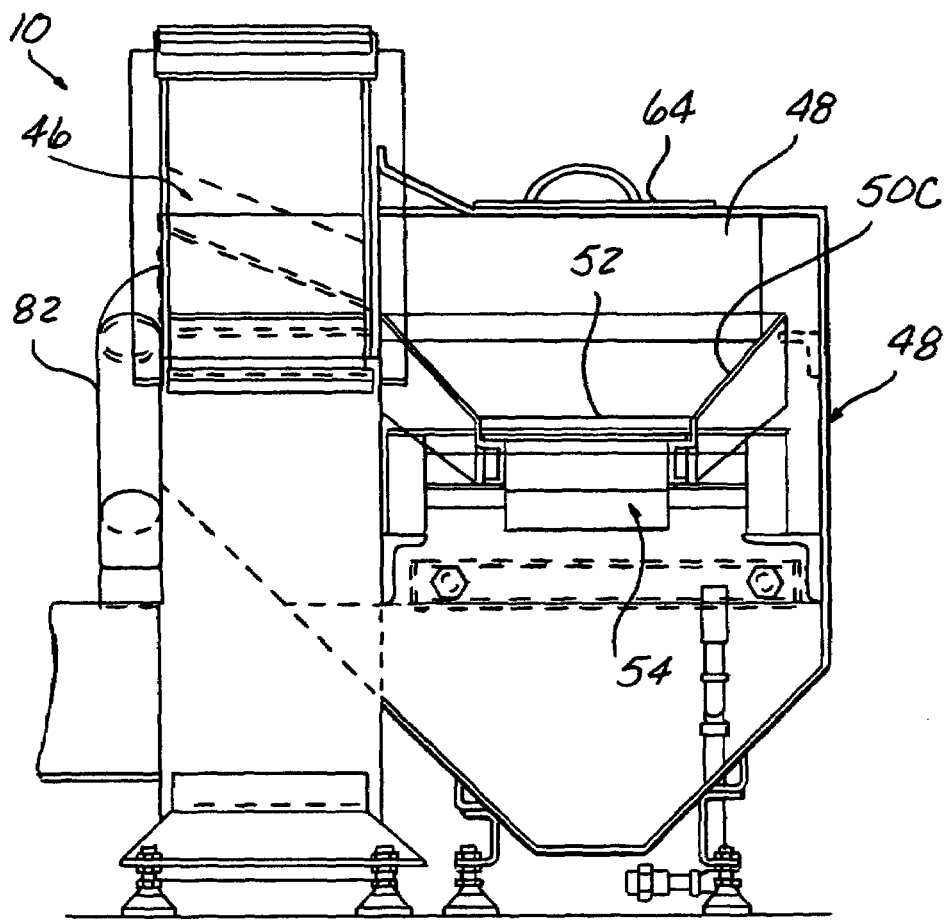
FIG. 1 is an end view of an apparatus according to the present invention.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawing figures, the apparatus according to the present invention includes a lift station 10 as described in EP 1122024.

Figure 3:
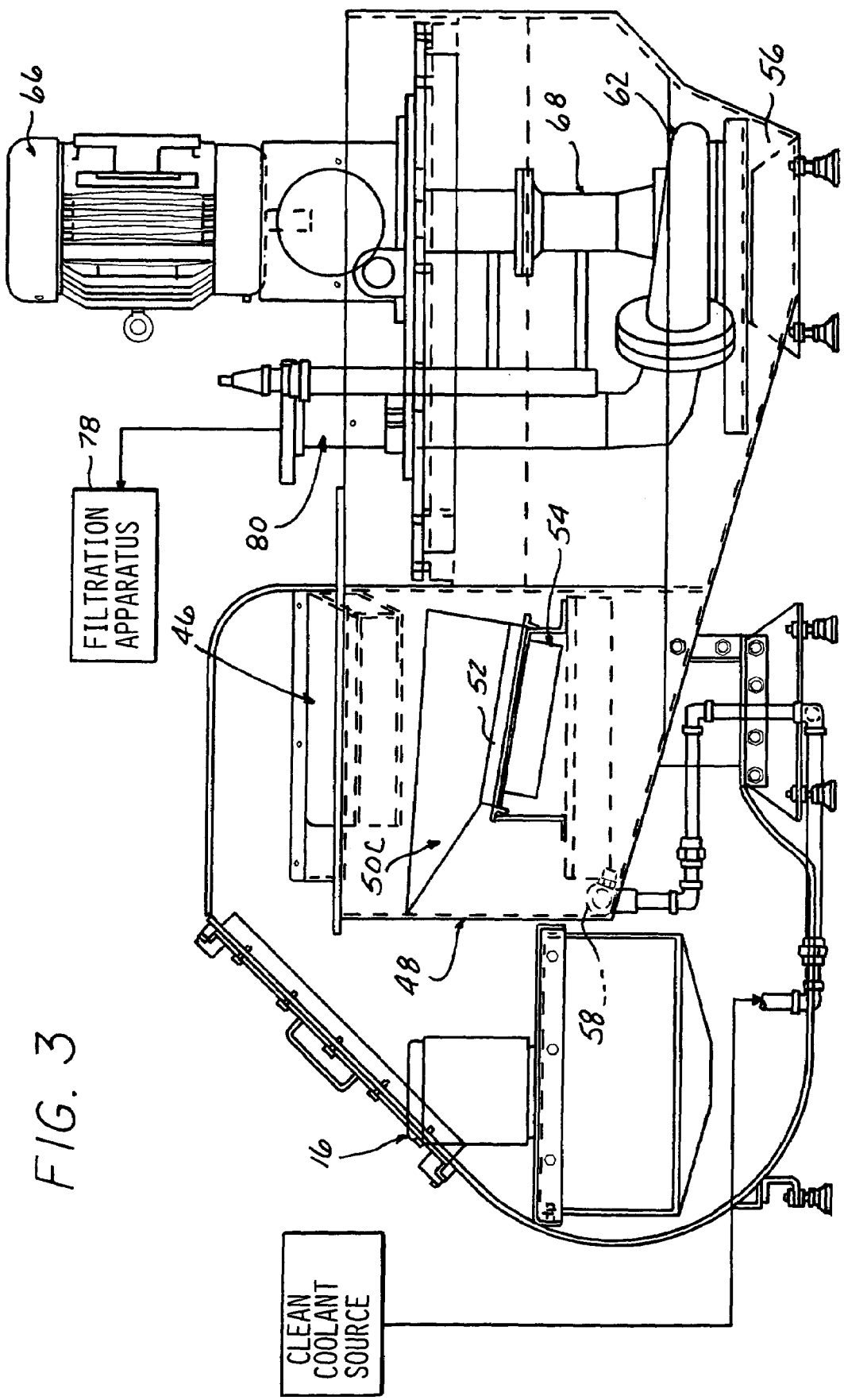
FIG. 3 is a side view of the lift station forming a part of the present invention.

The coolant lift station 10 includes a housing 12 and a bladed wheel 14 rotatably mounted therein, driven by a motor 16 (FIG. 3) and right angle drive (not shown).

The downstream end of a gravity trough 18 contains a shallow flowing stream of drained coolant collected from a machine tool installation 19. The gravity trough has a downwardly sloping bottom 20 and is connected to an inlet flange 22 at the right side of the housing 12.

The housing 12 has an inlet opening 24 receiving the coolant and entrained chips and other debris flowing in the shallow depth stream, typically only a few inches deep.

The bottom wall 26 of the housing 12 is also inclined downwardly to keep the coolant flowing into the housing interior, where a series of blades 28 are mounted to a hub here comprised of a drum 30 fixed on a rotatable axle shaft 32.

The blades 28 are welded or bolted to angle pieces 27 welded to the drum 30, optionally having interposed resilient sheets 29 in order to allow deflection when a large object enters the housing 12. The blades 28 may be constructed of ¼ inch thick sheet steel to be substantially rigid. Alternatively, thinner gauge spring steel or blue steel material can be used which will be deflectable without the interposed resilient sheets 29 to achieve the same result.

The blades 28 extends outwardly from the drum 30, in a direction tangential to the axis of rotation defined by the axle 32, and in a direction opposite to the direction of rotation, i.e., are backwardly raked to be oriented in a trailing direction. The backward rake of the blades 28 is believed to assist in obtaining improved upward slinging of the coolant and entrained debris from the blades 28 as they accelerate the coolant by the development of centrifugal force to a velocity sufficient to reach a weir edge 40.

Since there is an inherent unequal distribution of coolant being moved by the various blades 28, it has been found that reasonably smooth rotation is achieved by a set of eight blades as shown, although fewer or more could be used.

The blades 28 are shaped in close conformity to the cross sectional shape and size of the housing 12, i.e., in this embodiment the blades are rectangular about 24 inches wide, with only minimal edge clearances, i.e., on the order of ⅛th of an inch between the sides and ends and the adjacent trough walls. The cross sectional shape of the housing 12 in turn is generally matched to that of the trough 18.

Collection troughs 18 are typically square or rectangular in cross sectional shape due to the lack of available clearance in order to maximize flow area.

The housing 12 curves upwardly from the bottom wall 26 to a radiused rear wall 34, extending above the level of the shaft 32, which extends into an upwardly and backwardly extending segment 36 (which can also incorporate a removable access panel as shown). The inner surface 35 of the wall 34 follows the path of the outer edges of the blades 28 as the wheel 14 rotates.

The panel segment 36 and an opposite segment 38 define an exit chute 42 extending to a weir edge 40 over which coolant and debris are slung by rotation of the blades 28, weir edge 40 at a height well above the level of the trough bottom 20 and housing bottom 26.

The backward inclination of the outlet chute 42 extending back towards the front of the housing 12 is necessary to be generally aligned with the direction that the coolant is thrown off the blades 28 by rotation of the bladed wheel 14, as a forward inclination defeats upward flow of the coolant even with increased rotational speed. That is, coolant will be thrown backwardly when coming off the blades 28.

A certain minimum speed is necessary greater than the velocity of the flow stream, depending on the lift height required, an outer edge speed of 12–15 feet per second having been found to be sufficient for the application described.

The rotating trailing blades 28 overtake the coolant flowing in from the trough 18 and down the inclined housing bottom 26, and sweeps the coolant forward. This is accomplished without even any momentary interruption of the coolant flow in the trough 18 which could cause the chips to settle out and pile up, causing a rapid build up which might not be cleared away when flow resumes.

Initially, the inertia of the coolant causes it to be moved inward along the blade forward surface, i.e., radially inwardly. To limit the extent of this radially inward flow, a large diameter drum 30 is desirable rather than a small diameter shaft. As the coolant captured by the blade 28 is accelerated, centrifugal force subsequently causes radially outward movement of the coolant at an increasing velocity until achieving sufficient outward momentum so as to be slung from the blade 28 in the approximate direction in which the chute 42 extends, i.e., opposite the direction of inflow of coolant into the housing 12, passing over the weir edge 40. The trailing orientation of the blades 28 is believed to assist in slinging of the coolant and chips off the blades 28 in the approximate direction in which the chute 42 extends, i.e., opposite the direction of inflow of coolant into the housing 12, passing over the weir edge 40. The trailing orientation of the blades 28 is believed to assist in slinging of the coolant and chips off the blades 28 in an upward direction.

A forward housing wall 43 extends downwardly and then curves forwardly at its terminal lip 44.

Any slung coolant which does not reach and pass over the weir edge 40 drains down the forward wall 43 and is redirected towards the direction of the stream inflow, with momentum added in the forward direction of rotation of the blades 28, such as to be more likely to achieve sufficient upward momentum when again thrown off the blades 28 so as to reach the weir edge 40.

Figure 4:
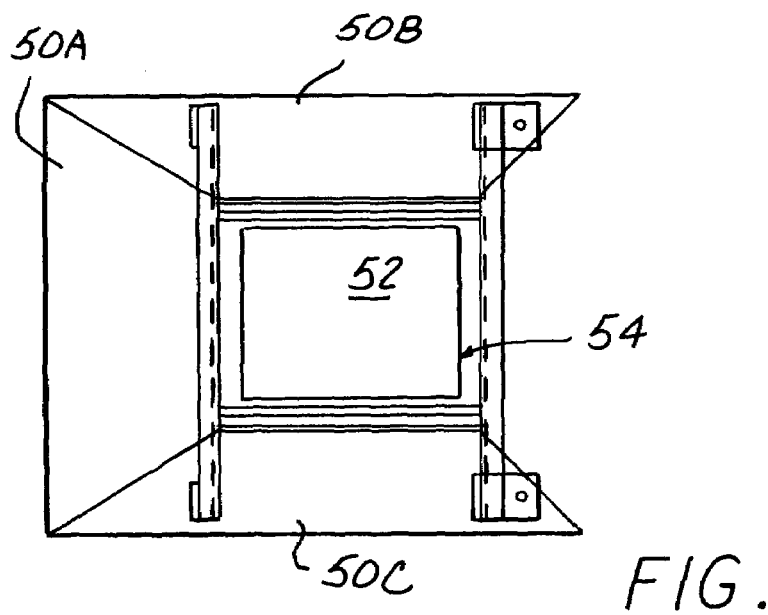
FIG. 4 is a normal detailed view of the magnetized body and shed plates shown in FIG. 3.
Figure 2:
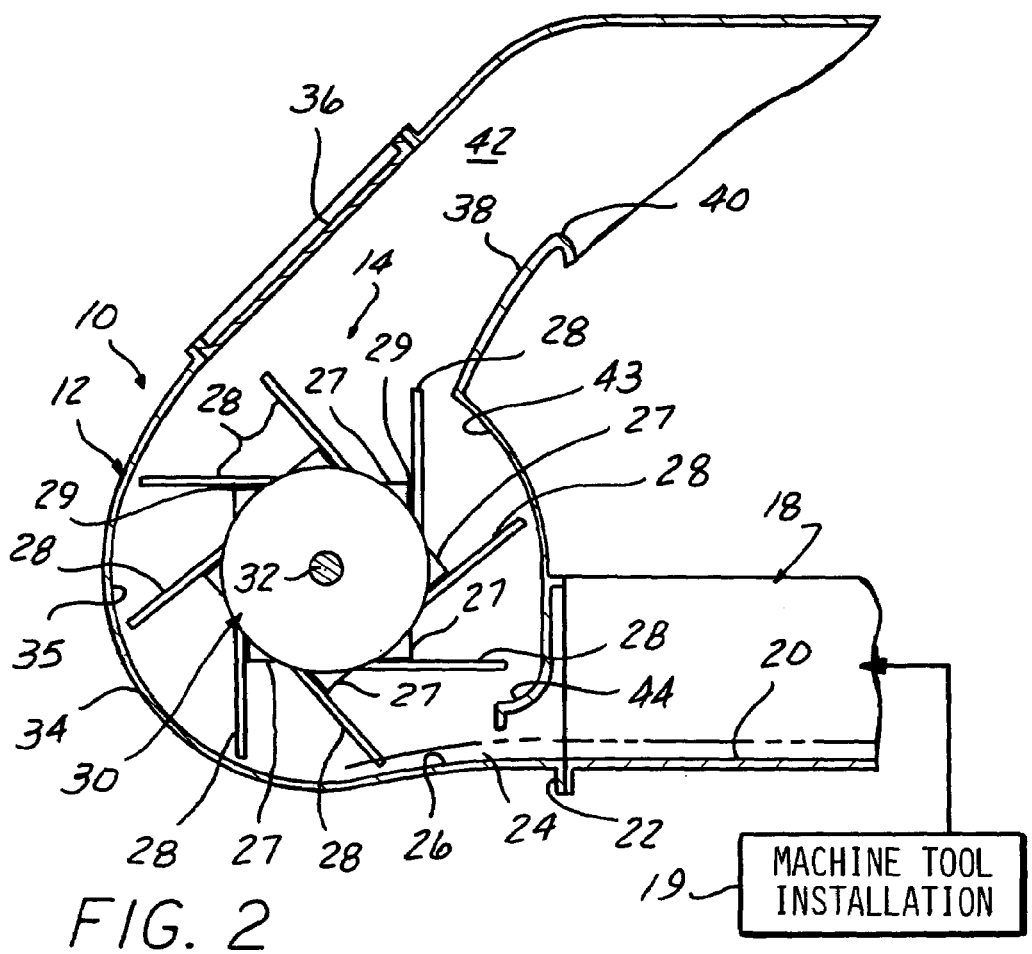
FIG. 2 is a side elevational diagram of the lift station forming a part of the present invention.

Coolant and entrained debris passing over the weir edge 40 enters a redirection discharge chute 46 extending at right angles to be directed into a collection tank 48 disposed alongside. The collection tank 48 has a series of inclined shed plates 50A, B, C as shown in FIG. 4 funneling the discharged coolant, chips and other debris in a plunging flow cascading onto the upper face 52 of a magnetized body 54 disposed at the bottom of the shed plates 50A, B, C.

The magnetized body 54 is preferably constructed of a rare earth material to create a very strong magnetic attraction on any ferrous metal item entrained in the plunging coolant, thereby brought into contact with the face 52 thereof. Face 52 is inclined at a shallow angle (≈10°) to the right as viewed in FIG. 3. The coolant and other debris is redirected to the right which is open to allow the coolant to cascade down into the collection tank proper 48, flowing down the sloping bottom wall to a well space 56 at the right in FIG. 3.

Any ferrous metal items impacting the face 52 are momentarily arrested at the face 52, which allows the strong magnetic field of the body 54 to capture and securely retain the same. A trap door 64 may be provided for periodic removal of such items.

A washer jet manifold 58 may be mounted at the upper side of the collector tank bottom wall 60 supplied with pressurized clean coolant, spraying down the bottom wall 60 to prevent the accumulation of chips or other debris.

Figure 5:
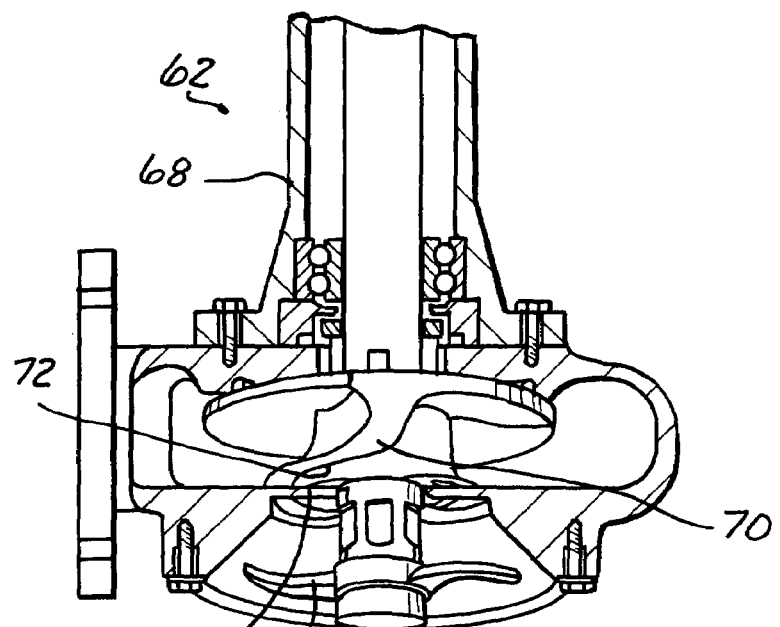
FIG. 5 is a partially broken away perspective view of the chopper pump shown in FIG. 4.

Mounted above the well space 56 is a chopper pump 62, driven by an electric motor 66 mounted above the tank 48 and connected by an oil filled tubular housing 68 to the pump. The chopper pump 62 is of a particular design available from Vaughan Co., Inc. Of Montesano, Wash., USA. This designed features an impeller 70 (FIG. 5) of hardened (60 Rockwell C) alloy steel (A5TM A148) which impeller has cutting edges 72 rotated past a cutter bar 74. In addition, a disintegrator tool 76 is mounted to rotate with the impeller 70 to agitate and break up chips and/or other debris prior to entering the pump. Vaughan pump model VSM-080 has been successfully employed for this purpose.

The aluminum chips are easily chopped up by such pump which also efficiently pumps the coolant to the back to the filtration apparatus 78 via an outlet 80.

Chip balls and tangles are easily handled by the agitator tool, which also captures and forces the same into the pump chamber to be cut up by the impeller cutting edges.

The impeller preferably spaced above the bottom of the well space 56 in order to reduce the suction to avoid sucking large objects into the pump 62.

An emergency overflow connection 82 can be provided to return coolant to the trough 18.

The invention claimed is:

1. Apparatus for recirculating machine tool coolant and entrained debris flowing in a shallow depth stream within a flow channel to a filtration apparatus, said apparatus comprising:
    a housing having an inlet opening connected to said channel to receive said flowing stream of coolant onto a bottom wall of said housing;
    a bladed wheel rotatably mounted within said housing and a drive motor for rotating said bladed wheel therein;
    said bladed wheel having a plurality of outwardly extending blades attached to a hub structure, said blades generally conforming to the cross sectional shape of an interior shape in said housing receiving said stream of flowing coolant and rotated in the same direction of said stream flow, said blades each having an outer edge passing over said bottom wall and sweeping said coolant in said stream therealong;
    said housing interior space defined by a wall surface curving upwardly along the path which said outer edges of each of said blades move so as to enable said coolant to be swept therealong and upwardly by rotation of said bladed wheel;
    said upwardly curving surface extending to a rearwardly and upwardly extending exit wall having a weir edge defined at an upper region thereof, coolant slung over said weir edge entering a discharge chute; said bladed wheel rotated by said drive motor to achieve sufficient blade velocity to sweep coolant upwardly and to sling said coolant up said exit wall, over said weir edge and into said discharge chute;
    a magnetized body disposed at a lower level below said discharge chute to receive descending coolant and debris so as to bring ferrous debris into contact therewith to be captured thereon by magnetic attraction;
    a collection tank receiving coolant flowing off said magnetized body; and
    a pump associated with said collection tank causing coolant and remaining debris collected in said collection tank to be circulated to said filtration apparatus.

2. The apparatus according to claim 1 wherein said pump comprises a chopper pump having an impeller formed with cutting edges cutting up entrained debris drained within a pump casing enclosing said impeller.

3. The apparatus according to claim 2 wherein said pump further includes an agitator tool attached to said impeller to rotate therewith and located to break up debris prior to entering said pump casing.

4. The apparatus according to claim 1 wherein said magnetized body is mounted to present an inclined surface against which said debris and entrained coolant plunges to bring any ferrous debris therein into contact therewith.

5. The apparatus according to claim 1 wherein said magnetized body is a rare earth magnet.

6. The apparatus according to claim 1, further including a series of shed plates mounted around said magnetized body so as to direct coolant and entrained debris from said discharge chute onto an upper surface of said magnetized body.

* * * * *